May 15, 1956 R. Y. MINER ET AL 2,745,995
MATHEMATICAL ANALYZER
Filed July 13, 1950 2 Sheets-Sheet 1

INVENTORS
RICHARD Y. MINER
QUENTIN J. EVANS &
BY CLIFFORD F. ABT.

Their ATTORNEYS.

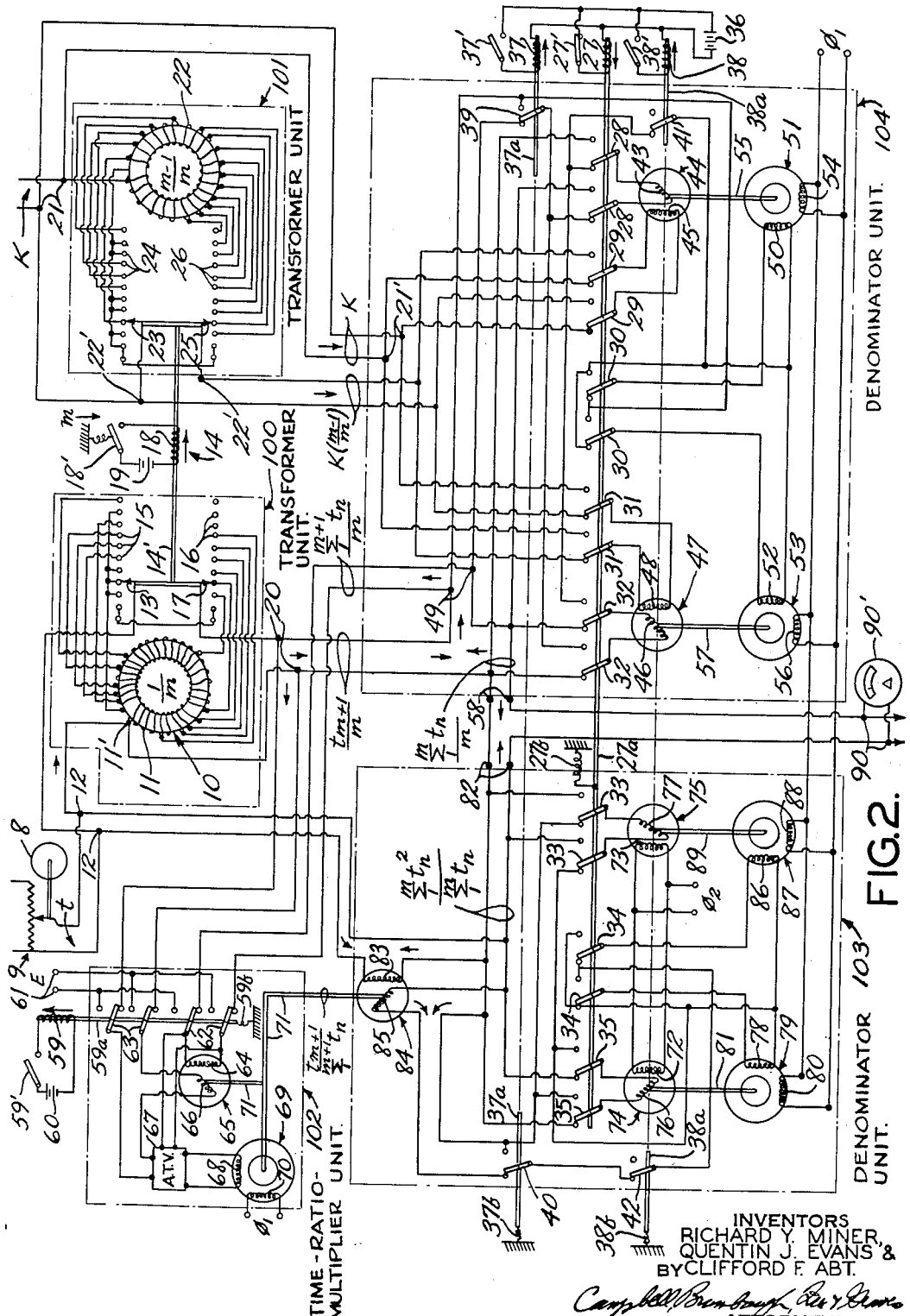

United States Patent Office 2,745,995
Patented May 15, 1956

2,745,995
MATHEMATICAL ANALYZER

Richard Y. Miner and Quentin J. Evans, New York, and Clifford F. Abt, Long Island City, N. Y., assignors to American Bosch Arma Corporation Application July 13, 1950, Serial No. 173,528

26 Claims. (Cl. 318—19)

This invention relates to electromechanical computing apparatus, and has particular reference to apparatus for systematically arranging input signals corresponding to elapsed time, observations of distance travelled north and distance travelled east by a target, and then combining these observations so as to produce the various terms in the equations of the speed of the target north and east when the constants of these equations are to be determined by the principle of "least squares."

The invention is predicated on the expression of the speed of the target north, or east, as a fraction in which both the numerator and denominator have the form $$\frac{\sum_{1}^{m} t_n X_n}{\sum_{1}^{m} t_n} - \frac{\sum_{1}^{m} X_n}{m}$$

wherein $t_n$ is the time which has elapsed between the initial and the $n^{th}$ observations of target position in a sequence of $m$ observations, i. e., $n=1, 2, 3 \ldots m$; $X_n$ represents either $t_n$, $D_{en}$ or $D_{nn}$, where $D_{en}$ is the distance travelled east by the target in the interval between the initial and $n^{th}$ observation; and $D_{nn}$ is the distance travelled north by the target in the interval between the initial and $n^{th}$ observation;

$$\sum_{1}^{m}$$

indicates a summation of $m$ terms of the expression following the symbol $$\sum_{1}^{m}$$

so that the expression $$\sum_{1}^{m} t_n X_n$$

represents the summation $t_1 X_1 + t_2 X_2 + t_3 X_3 + \ldots t_m X_m$.

In accordance with this invention, a voltage proportional to $$\frac{\sum_{1}^{m} X_n}{m}$$

is produced by reducing the excitation voltage of an induction potentiometer to $$\frac{m-1}{m}$$

of the excitation existing when the output of the rotor winding of the induction potentiometer is matched to a voltage proportional to $$\frac{\sum_{1}^{m} X_n}{m-1}$$

The voltage proportional to $$\frac{\sum_{1}^{m} X_n}{m-1}$$

is produced, in effect, by adding a voltage proportional to $$\frac{X_m}{m-1}$$

to a voltage proportional to $$\frac{\sum_{1}^{m-1} X_n}{m-1}$$

previously found in the manner described.

In the interval between the $m$ and $m+1$ observations, a voltage proportional to $$\frac{\sum_{1}^{m+1} t_n X_n}{\sum_{1}^{m+1} t_n}$$

is produced by adding a voltage proportional to $$\frac{\sum_{1}^{m} t_n X_n}{\sum_{1}^{m} t_n}$$

to the output of the rotor winding of an induction potentiometer whose stator winding is excited by a voltage proportional to $$X_{m+1} - \frac{\sum_{1}^{m} t_n X_n}{\sum_{1}^{m} t_n}$$

and whose rotor winding is displaced by an amount proportional to $$\frac{t_{m+1}}{\sum_{1}^{m+1} t_n}$$

The total voltage $$\frac{\sum_{1}^{m} t_n X_n}{\sum_{1}^{m} t_n} + \left( X_{m+1} - \frac{\sum_{1}^{m} t_n X_n}{\sum_{1}^{m} t_n} \right) \left( \frac{t_{m+1}}{\sum_{1}^{m+1} t_n} \right)$$

is proportional to $$\frac{\sum_{1}^{m+1} t_n X_n}{\sum_{1}^{m+1} t_n}$$

and is preserved by matching the output of another induction potentiometer to this value for use in evaluating the function for the succeeding observation.

The displacement of a shaft by an amount proportional to $$\frac{t_{m+1}}{\sum_{1}^{m+1} t_n}$$

is achieved by matching the output of the rotor winding of an induction potentiometer to a voltage equivalent to $$\frac{t_{m+1}}{m}$$

while applying a signal proportional to $$\frac{\sum_{1}^{m+1} t_n}{m}$$

across the stator winding of the potentiometer, whereby the rotor displacement is proportional to $$\frac{\frac{t_{m+1}}{m}}{\frac{\sum_{1}^{m+1} t_n}{m}}$$

or simply $$\frac{t_{m+1}}{\sum_{1}^{m+1} t_n}$$

For a more complete understanding of the invention reference may be had to the accompanying drawings in which:

Fig. 2 is a schematic diagram of the circuits in which the denominator of the expressions for target speed north and east are calculated; and Figs. 3 and 4 are schematic diagrams of the circuits in which the numerators of the expression for target speed north and east, respectively, are calculated.

Figure 1:
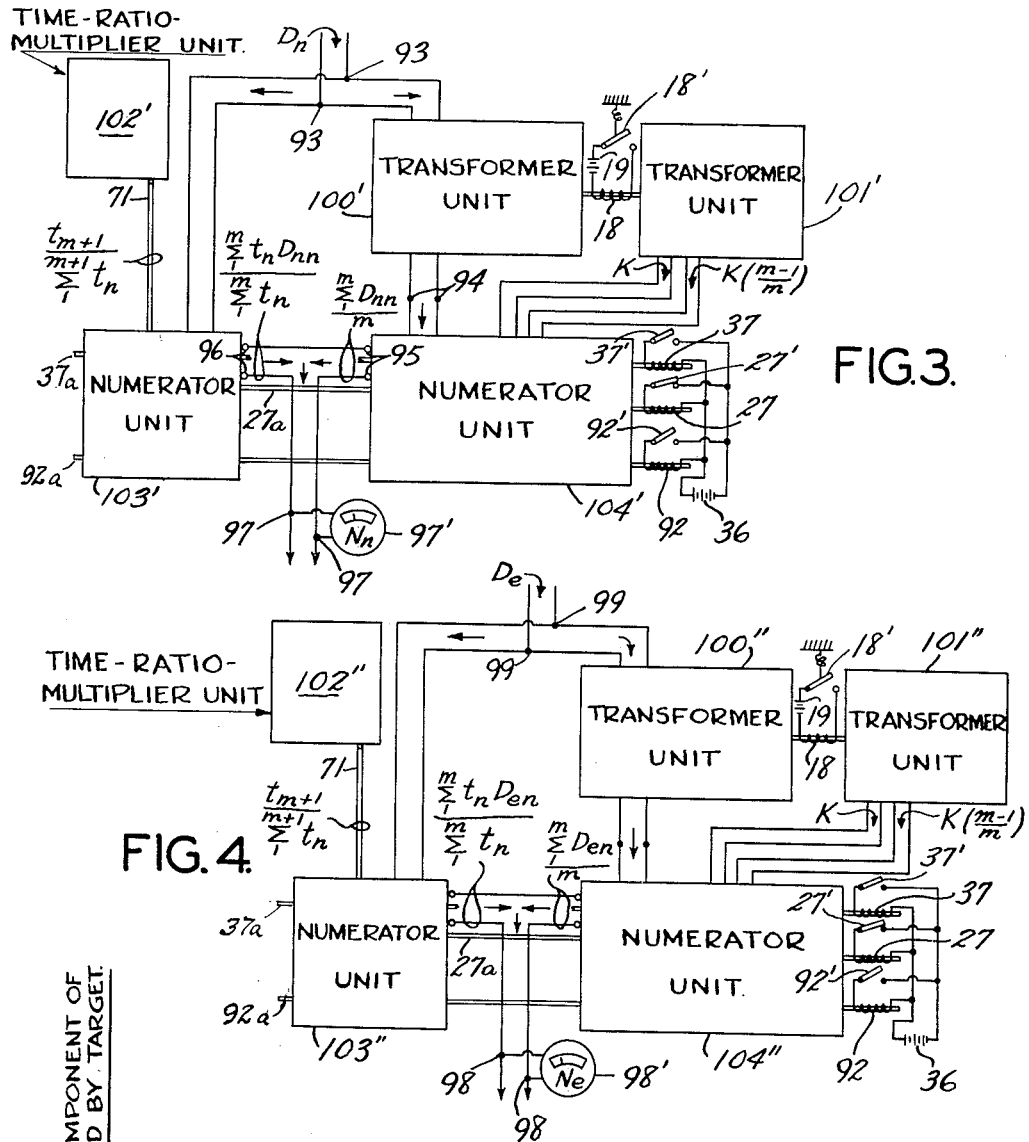
Figure 1 is a diagram exemplifying graphically typical observed data of the north, or east, component of target travel, plotted against elapsed time, and the most probable straight line through these observations.
Figure 1:
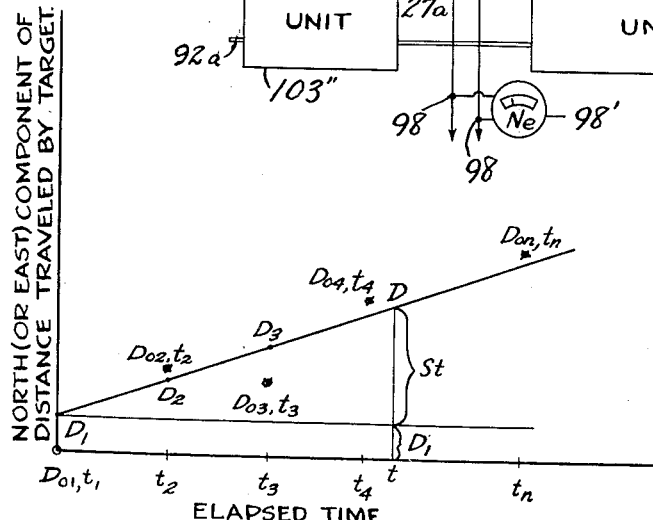

Referring to the diagram of Fig. 1, the observed values of the north, or east, components of target travel $D_{01}$, $D_{02}$, $D_{03}$ . . . $D_{on}$ taken at respective times $t_1$, $t_2$, $t_3$ . . . $t_n$, are plotted against the values of elapsed time. Since both $D_{01}$ and $t_1$ are zero at the initial observation, the origin of the axes is $D_{01}$, $t_1$.

Assuming the target to be moving on a straight course with constant speed, the slope of the best straight line drawn through these points as shown in Fig. 1, represents the speed of the target north, or east. The equation for the straight line can be written as $D = St + D_1$, where $D$ is the distance travelled by the target north, or east, $D_1$ is the $D$ intercept, $S$ is the slope of the line, and $t$ is the elapsed time.

The theory of least squares utilized in this invention postulates that the most representative curve through a series of observations is that curve for which the sum of the squares of the residuals, or the differences between the observed value and the probable value, is a minimum. The best straight line for the data plotted in Fig. 1 is, therefore, the one for which the summation:

$$\Sigma(D_0 - D)^2 = (D_{01} - D_1)^2 + (D_{02} - D_2)^2 + (D_{03} - D_3)^2 + \ldots + (D_{0n} - D_n)^2$$

in a minimum. The minimum occurs when the partial derivatives with respect to $D_1$ and $S$ are zero.

Since $(D_0 - D)^2 = (D_0 - D_1 - St_1)^2$, the partial derivative of $\Sigma(D_0 - D)^2$ with respect to $D^1$, made equal to zero is $$\frac{\delta}{\delta D_1} \Sigma (D_0 - D_1 - St)^2 = \Sigma 2(D_0 - D_1 - St) = 0$$

$$\Sigma D_0 - \Sigma D_1 - \Sigma St = 0 \qquad (1)$$

And the partial derivative with respect to $S$, made equal to zero, is $$\frac{\delta}{\delta S} \Sigma (D_0 - D_1 - St)^2 = \Sigma (2t)(D_0 - D_1 - St) = 0$$

or $$\Sigma D_0 t - \Sigma D_1 t - \Sigma S t^2 = 0 \qquad (2)$$

Equations 1 and 2 are set into the general form $$\sum_1^m D_{0n} - m D_1 - S \sum_1^m t_n = 0 \qquad (1A)$$

$$\sum_1^m D_{0n} t_n - D_1 \sum_1^m t_n - S \sum_1^m t_n^2 = 0 \qquad (2A)$$

in which $n$ is the order number of an observation in a continuous sequence of $m$ observations, starting from one, and $$\sum_1^m$$

represents a summation of $m$ terms.

$S$ is then found to be $$S = \frac{m \sum_1^m D_{0n} t_n - \sum_1^m D_{0n} \sum_1^m t_n}{m \sum_1^m t_n^2 - \left(\sum_1^m t_n\right)^2} \qquad (3)$$

Dividing the numerator and denominator by $$m \sum_1^m t_n$$

gives $$S = \frac{\dfrac{\sum_1^m D_{0n} t_n}{\sum_1^m t_n} - \dfrac{\sum_1^m D_{0n}}{m}}{\dfrac{\sum_1^m t_n^2}{\sum_1^m t_n} - \dfrac{\sum_1^m t_n}{m}} \qquad (3A)$$

This expression gives the speed north, or east, when the observed distances travelled north, or east, and time values are substituted. Thus, target speed north, or $S_n$, is equal to $$\frac{\text{Numerator North}}{\text{Denominator North}}$$

or $$\frac{N_n}{\Delta_n}$$

and target speed east, or $S_e$, equals $$\frac{\text{Numerator East}}{\text{Denominator East}}$$

or $$\frac{N_e}{\Delta_e}$$

Inasmuch as the denominators of the expressions for $S_n$ and $S_e$ involve only functions of time, the denominators are identical and $\Delta_n = \Delta_e = \Delta$.

Evaluating the fraction $$\frac{\sum_1^m X_n}{m}$$

where $X_n$ is either $t_n$ or $D_{on}$, the addition of the quantity $$\frac{X_{m+1}}{m}$$

to the fraction $$\frac{\sum_1^m X_n}{m}$$

produces a value V equal to $$\frac{\sum_{1}^{m+1} X_n}{m}$$

and, at the succeeding observation, where $m$ has been increased by unity, the fraction $$\frac{\sum_{1}^{m} X_n}{m-1}$$

also is equal to the same value V. Hence, when the fraction is multiplied by $$\frac{(m-1)}{m}$$

the function $$\frac{\sum_{1}^{m} X_n}{m}$$

results for the new observation, and may be written symbolically as follows:

$$\frac{\sum_{1}^{m+1} X_n}{m+1} = \left(\frac{\sum_{1}^{m} X_n}{m} + \frac{X_{m+1}}{m}\right)\frac{m}{m+1} \quad (4)$$

This is essentially the form used for evaluation of the function in this invention.

The expression $$\frac{\sum_{1}^{m+1} t_n X_n}{\sum_{1}^{m+1} t_n}$$

may be expanded into the form $$\frac{\sum_{1}^{m+1} t_n X_n}{\sum_{1}^{m+1} t_n} = \frac{\sum_{1}^{m} t_n X_n}{\sum_{1}^{m+1} t_n} + \frac{t_{m+1} X_{m+1}}{\sum_{1}^{m+1} t_n} \quad (5)$$

which in turn may be rewritten as $$\frac{\sum_{1}^{m+1} t_n X_n}{\sum_{1}^{m+1} t_n} = \frac{\sum_{1}^{m} t_n X_n}{\sum_{1}^{m} t_n} \cdot \frac{\sum_{1}^{m} t_n}{\sum_{1}^{m+1} t_n} + \frac{t_{m+1} X_{m+1}}{\sum_{1}^{m+1} t_n} \quad (6)$$

Inasmuch as $$\sum_{1}^{m} t_n = \sum_{1}^{m+1} t_n - t_{m+1}$$

Equation 6 may be transformed into $$\frac{\sum_{1}^{m+1} t_n X_n}{\sum_{1}^{m+1} t_n} = \frac{\sum_{1}^{m} t_n X_n}{\sum_{1}^{m} t_n} + \frac{t_{m+1}}{\sum_{1}^{m+1} t_n}\left(X_{m+1} - \frac{\sum_{1}^{m} t_n X_n}{\sum_{1}^{m} t_n}\right) \quad (7)$$

Equation 7 is used herein to evaluate the functions $$\frac{\sum_{1}^{m} D_{0n} t_n}{\sum_{1}^{m} t_n} \text{ and } \frac{\sum_{1}^{m} t_n^2}{\sum_{1}^{m} t_n}$$

of Equation 3A, while Equation 4 demonstrates the method used to evaluate $$\frac{\sum_{1}^{m} D_{0n}}{m} \text{ and } \frac{\sum_{1}^{m} t_n}{m}$$

of Equation 3A.

The foregoing problem solution is effected electromechanically in the computing apparatus of this invention illustrated schematically in Fig. 2, which omits the usual amplifiers, damping devices for the motors, and scaling elements in the interest of simplicity, but it will be understood that such units will be embodied in the instrument.

It will be observed that the instrument illustrated in Fig. 2 is subdivided into several components, namely, a pair of transformer units designated 100 and 101, a time-ratio-multiplier unit 102, and a pair of denominator units 103 and 104. The letters $\phi_1$ and $\phi_2$ shown at units 102, 103 and 104 designate the phases of a constant two-phase alternating current voltage supply.

The winding 11 of the transformer 10 of transformer unit 100 is energized by a voltage $t$, proportional to the time elapsed since the first observation ($m=1$), where "$m$" is the order number of an observation in a continuous sequence of observations, and $t=0$ when $m=1$. This voltage, $t$, is derived from a suitable time-controlled circuit, of which the simplest form consists of a synchronous motor 8 driving the brush of the linear potentiometer 9 energized by $\phi_2$ whose output terminals 12 are connected to one extremity 11' of transformer winding 11 and to brush 13 of multiple pole, multiple position stepping switch 14 which may be of the pawl and ratchet type, the brush bar 14' having the ratchet cooperating with a fixed spring pawl, not shown.

A series of taps on transformer winding 11 are connected to a bank of stationary contacts 15 of step switch 14 with which brush 13 cooperates, while a second series of taps on transformer winding 12 are connected to a second bank of stationary contacts 16 with which brush 17, also carried by bar 14' cooperates. The transformer winding 11, stationary contact series 15 and 16, and brushes 13 and 17 comprise the transformer unit 100.

Brushes 13 and 17 are advanced simultaneously to the right from one position to the next as the observer depresses switch 18' to energize relay winding 18 momentarily from power supply 19 at each observation $m$. The output of transformer 10, available between brush 17 and the end tap 11' of transformer winding 11 and applied to terminals 20, is exactly equal to $$\frac{1}{m}$$

of the input voltage $t$ as the number of both the input and output turns are changed at each observation, thus making the output voltage at terminals 20 proportional to $$\frac{t}{m}$$

At the instant that switch 18' is closed at each observation, the amplitude of the output voltage of transformer 10 at terminals 20 is proportional to $$\frac{t_m}{m}$$

and, just prior to the subsequent closure of switch 18', the output of transformer 10 has been built up to a voltage whose amplitude is proportional to $$\frac{t_{m+1}}{m}$$

inasmuch as the signal proportional to $t$ increases continuously as motor 8 drives the brush of timer potentiometer 9.

Referring now to the second transformer unit 101, the constant $\varphi_2$ voltage K, is applied across input terminals 21, one of which is directly connected to one extremity of transformer winding 22, while the other terminal 21 is connected to brush 23 carried by bar 14' of switch 14 and cooperating with a bank of stationary contacts 24 severally connected to a series of corresponding taps of transformer winding 22. A second brush 25 carried by bar 14' of switch 14 cooperates with a separate bank of stationary contacts 26 severally connected to a second series of corresponding taps on transformer winding 22.

As the observer closes switch 18' at each observation, $m$, brushes 23, 25 are advanced one step to the right to cooperate with the next corresponding stationary contacts 24, 26, thus varying the ratio of output to input turns of transformer winding 22 in a manner such as to make the output voltage of transformer winding 22 equal to $$K\left(\frac{m-1}{m}\right)$$

and available between brushes 23 and 25 and across output terminals 22' connected thereto.

Operatively connected to switches 28, 29, 30, 31 and 32 of denominator unit 104, and also to switches 33, 34 and 35 of denominator unit 103, for simultaneously actuating them, is a common operating bar 27a serving as the armature for relay winding 27 energized from power supply 36 when switch 27' is manually closed. Switches 28, 29, 30, 31, 32, 33, 34 and 35 are simultaneously moved to the left to the position shown in Fig. 2 when relay winding 27 is energized by closing switch 27' at odd-numbered "$m$" observations. When $m=2$, $m=4$, $m=6$, etc. switch 27' is opened and spring 27b urges armature bar 27a to the right, thus causing switches 28, 29, 30, 31, 32, 33, 34, 35 to be moved to the right and be positioned oppositely to that shown by Fig. 2.

When switch 37' is manually closed, relay 37 is energized from power supply 36 to draw its long armature bar 37a to the right against the action of spring 37b to close switch 39 of denominator unit 104 and switch 40 of denominator unit 103 to the right. Another normally open manual switch 38' is provided and energizes relay 38 to actuate armature bar 38a, which like bar 37a extends across denominator units 104 and 103 and actuates their respective switches 41 and 42. Switches 39 and 40 are positioned as shown in Fig. 2 when relay 37 is deenergized and spring 37b urges armature bar 37a to the left. Similarly, switch 38' is normally open so that relay winding 38 is deenergized and switches 41, 42 are closed to the left, as shown in Fig. 2, by the action of spring 38b.

Considering the right-hand denominator unit 104, rotor winding 43 of induction potentiometer 44 is connected to the movable contacts of switch 28, while the stator winding 45 is connected to the movable contacts of switch 29. Similarly, rotor winding 46 of induction potentiometer 47 is connected to the movable contacts of switch 32, while the stator winding 48 is connected to movable contacts of switch 31.

Before the initial observation of the target is made, i. e., when $m=0$, step switch 14 is manually set to the "zero" condition, i. e., to its first postion, while switch 27' is open and relay winding 27 is deenergized, whereas switch 37' is manually closed so that relay winding 37 is energized. This positions switches 28, 29, 30, 31, 32 and 39 to the right, oppositely to that shown in Fig. 2. Accordingly, stator winding 48 of induction potentiometer 47 is energized from terminals 21' and 21 through switches 31 by the constant voltage K, and rotor winding 46 of potentiometer 47 is directly connected in series with control field winding 52 of motor 53 through switches 32, 39, 30 and 41. Main field winding 56 of motor 53 is energized from $\varphi_1$, so that motor 53 drives shaft 57 and the rotor of induction potentiometer 47 to the position where the output voltage of rotor winding 46 is zero, and control field winding 52 is deenergized and motor 53 stops.

At the intial observation when $m=1$, switch 37' is reopened to deenergize relay winding 37, which remains deenergized for the remainder of the solution so that spring 37b throws switch 39 to the left-hand position, whereas switch 27' is closed, so that energized relay winding 27 throws switches 28, 29, 30, 31, 32 to the left-hand position shown in Fig. 2. Also at the time of the initial observation, key switch 18' is closed to energize relay 18 and advance switch 14 one step to the right, so that brushes 15, 17, 23, 25 are moved to the second position. Thereupon, stator winding 45 of induction potentiometer 44 is energized by the voltage K from terminals 21' and 21 and switches 29, while stator winding 48 of induction potentiometer 47 is not energized although connected to terminals 22', since the exciting voltage $$K\left(\frac{m-1}{m}\right)$$

from transformer unit 101 is zero.

The output of right-hand denominator unit 104, at terminals 58, for odd-numbered "$m$" observations, is the output of rotor winding 46 of potentiometer 47 through switch 32 and, when $m=1$, the output voltage is zero. However, the rotor winding 46 of potentiometer 47 is electrically connected in series with terminals 20 and 49, so that the voltage at terminals 49 is the algebraic sum of the voltage at terminals 20 and the output voltage of induction potentiometer 47.

Terminals 49 are electrically connected in series with control field winding 50 of induction motor 51, and rotor winding 43 of induction potentiometer 44, through switches 30, 41, 28 and 39, so that the voltage in control field winding 50 of motor 51 is the algebraic difference between the voltages at terminals 49 and the output voltage of induction potentiometer 44. It will be observed that when switch 30 lies in the position shown, it also short-circuits the control field winding 52 of induction motor 53.

Main field winding 54 of motor 51 is energized from $\phi_1$, and the shaft 55 of motor 51 is connected to the rotor winding 43 of induction potentiometer 44 so as to drive the same to the position where the output voltage of induction potentiometer 44 is matched to the signal voltage at terminals 49, and the control field winding 50 excitation is zero and motor 51 stops.

The amplitude of the voltage output from transformer unit 10 and available at terminals 20 increases continuously between observations and, just prior to the second observation, is proportional to $$\frac{t_2}{1}$$

so that the output voltage of rotor winding 43 of induction potentiometer 44 is matched to $t_2$.

When switch 18' is closed at the second observation ($m=2$), switch 14 is advanced one step to the right and switch 27' is opened to deenergize relay winding 27, so that spring 27b throws switches 28, 29, 30, 31, 32 to the right to the position opposite to that shown in Fig. 2. Thereupon, the output of denominator unit 104 at terminals 58 no longer is the output of potentiometer 47, but for even-numbered "$m$" observations it is the output of rotor winding 43 of potentiometer 44, which is now connected to output terminals 58 through switches 28. Previously, the rotor winding 43 output voltage was matched to a voltage proportional to $t_2$, with a stator winding 45 excitation of K, but the shift of switches 29 connected them to output terminals 22' of transformer unit 101, so that the excitation voltage of stator winding 45 now is proportional to $$K\left(\frac{m-1}{m}\right)$$

which for $m=2$ is proportional to $$\frac{K}{2}$$

Therefore, the amplitude of the output voltage at terminals 58 is proportional to $$\frac{t_2}{2}$$

Rotor winding 43 of potentiometer 44 is also connected in series with terminals 20 and 49 when switches 28 are shifted to the right, so that the voltage at terminals 49 is the algebraic sum of the output voltage of rotor winding 43 and the voltage at terminals 20. Similarly, rotor winding 46 of potentiometer 47 is now connected through switches 32 in series with terminals 49 and the control field winding 52 of motor 53, so that motor 53 drives rotor winding 46 until the output voltage of rotor winding 46 is matched to the signal at terminals 49, the stator winding 48 excitation being the voltage K from terminals 21' through switches 31.

Just prior to the third observation ($m=3$) the amplitude of the voltage at terminals 49 has increased to a value proportional to $$\frac{t_2+t_3}{2}$$

When switch 18' is closed at the third observation, switch 14 is advanced one step to the right and switch 27' is closed to energize relay winding 27, so that the amplitude of the voltage at terminals 58 is proportional to $$\left(\frac{t_2+t_3}{2}\right)\left(\frac{2}{3}\right)$$

or $$\frac{t_2+t_3}{3}$$

or, in general terms, is proportional to $$\frac{\sum_{1}^{m} t_n}{m}$$

where $m=3$, while the matching voltage at terminals 49 builds up to a voltage whose amplitude is proportional to $$\frac{t_2+t_3+t_4}{3}$$

or, in general terms, $$\frac{\sum_{1}^{m+1} t_n}{m}$$

just before the fourth observation. It is evident that for each succeeding observation, the amplitude of the voltage at terminals 58 is proportional to $$\frac{\sum_{1}^{m} t_n}{m}$$

one of the two terms in the denominator of Equation 3A.

In time-ratio-multiplier unit 102, located at the upper left of Fig. 2, relay winding 59 is energized from power supply 60 by closing switch 59' when $m=0, 1$, thus urging the armature 59a and connected movable contacts of switches 62 and 63 upwardly against the action of spring 59b. When $m=2$, and for the remainder of the problem, switch 59' is open and relay winding 59 is deenergized, so that spring 59b urges the armature 59a and the movable contacts of switches 62 and 63 downwardly to the position shown in Fig. 2.

In this position of switch 62, the voltage proportional to $$\frac{\sum_{1}^{m+1} t_n}{m}$$

from terminals 49 of denominator unit 104 is transmitted through switch 62 and applied across stator winding 64 of induction potentiometer 65, whose rotor winding 66 is connected in series with the movable contacts of switch 63 and the input to vacuum tube attenuator 67, so that the signal applied to attenuator 67 is the algebraic difference of the voltage, $$\frac{t_{m+1}}{m}$$

from terminals 20 and the output voltage of induction potentiometer 65.

The voltage input to stator winding 64 of potentiometer 65 is also the control voltage of attenuator 67, whose output energizes control field winding 68 of induction motor 69, the main field winding 70 of which is energized from $\phi_1$. Motor 69 drives shaft 71 connected to rotor winding 66 of induction potentiometer 65 until the output voltage of rotor winding 66 is matched to $$\frac{t_{m+1}}{m}$$

the signal from terminals 20 which is transmitted through switch 63, and the signal input to attenuator 67 is zero, so that control field winding 68 is deenergized and motor 70 stops. Since the stator winding 64 of potentiometer 65 is energized by a voltage proportional to $$\frac{\sum_{1}^{m+1} t_n}{m}$$

and the output of the rotor winding 66 is $$\frac{t_{m+1}}{m}$$

it follows that the displacement of shaft 71 is proportional to $$\frac{\frac{t_{m+1}}{m+1}}{\sum_{1}^{m+1} t_n}$$

which is the mechanical output of time-ratio-multiplier unit 102.

The vacuum tube attenuator 67 is a variable gain amplifier in which the signal gain is controlled by the control voltage, so that increasing control voltage causes decreasing gain. The use of such vacuum tube attenuator 67 in the time-ratio-multiplier unit 102 provides a nearly constant error voltage to control field wniding 68 of motor 69 for a specific error displacement of shaft 71 for all values of excitation of stator winding 64 of potentiometer 65. Although the output voltage of rotor winding 66 increases for increased excitation of potentiometer 65, the gain of attenuator 67 is decreased, thereby maintaining a substantially constant relationship between the error displacement of shaft 71 and the output of attenuator 67. This action is desirable for proper damping of motor 69, in which a resonant damping circuit preferably is used.

Switch 59' is closed and its relay 59 is energized when $m=0, m=1$, thereby actuating switches 62 and 63 to the position opposite that shown in Fig. 2, and the constant voltage E applied at terminals 61 is transmitted through both switches 62 and 63. Shaft 71 is therefore driven by motor 69 to the position corresponding to unity, indicating the value of $$\frac{\frac{t_{m+1}}{m+1}}{\sum_{1}^{m+1} t_n}$$

since the value of $$\frac{\frac{t_{m+1}}{m+1}}{\sum_{1}^{m+1} t_n}$$

where $m=1$ is $$\frac{t_2}{\sum_1^2 t_2} = \frac{t_2}{t_2} = 1$$

When $m=2$, switch 59' is opened to deenergize relay winding 59, so that motor 69 drives the shaft 71 to continuously position it to correspond to $$\frac{t_3}{(t_2+t_3)}$$

or $$\frac{t_{m+1}}{\sum_1^{m+1} t_n}$$

where $m=2$ as the $t$ signal at terminals 12 increases.

In the second denominator unit 103, when $m=0$ the movable contacts of switches 33, 34, 35 and 40 are positioned oppositely to that shown in Fig. 2, so that the rotor winding 76 of induction potentiometer 74 is connected through switches 35, 40, 42 and 34 in series with control field winding 78 of motor 79, whereby the output voltage of rotor winding 76 energizes control field winding 78 of motor 79. The main field winding 80 of motor 79, being energized from $\phi_1$, motor 79 drives shaft 81 and rotor winding 76 to the position where the output voltage of rotor winding 76 is zero, and the control field winding 78 of motor 79 is deenergized. The stator windings 72 and 73 of induction potentiometers 74 and 75 are energized from $\phi_2$.

Considering a typical sequence of operation, and beginning with the first observation when $m=1$, switch 27' is closed to energize relay 27, which moves switch bar 27a to the position shown in Fig. 2, so that the switches 33, 34, 35 are positioned as shown in Fig. 2 and switch 37' is opened, as previously described, so that switch 40 is urged to the left by spring 37b. Rotor winding 76 is now connected by switches 35 to the output terminals 82 of denominator unit 103, so that the output signal voltage of unit 103 is zero.

The stator winding 83 of induction potentiometer 84 is connected in series with terminals 12 and 82, so that the amplitude of the voltage across stator winding 83 is the algebraic difference between the voltages at terminals 12 and 82, and is proportional to $t-0$ or $t$. The rotor of induction potentiometer 84 is driven by shaft 71 of the time-ratio-multiplier unit 102, so that the rotor winding 85 output voltage is proportional to $(t) \times (1) = t$.

Closure of switches 33 and 34, and also switches 40 and 42 to the left, connect rotor winding 77 of induction potentiometer 75 in series with control field winding 86 of motor 87, rotor winding 85 of induction potentiometer 84, and terminals 82. The main field winding 88 of motor 87 is energized from $\phi_1$, so that motor 87 is energized and its output shaft 89 drives rotor winding 77 of potentiometer 75 to the position where the output voltage of rotor winding 77 matches the algebraic sum of the voltage $t$ from rotor winding 85, and the zero voltage at terminals 82, whereby control field winding 86 is deenergized and motor 87 stops. Just prior to the second observation, the voltage at terminals 12 is proportional to $t_2$ so that the output voltage of rotor winding 77 is also proportional to $t_2$.

At the second operation when $m=2$, switch 27' is opened, thereby deenergizing relay winding 27 to allow spring 27b to throw switches 28, 29, 30, 31, 32, 33, 34 and 35 to the right, opposite to the position shown in Fig. 2. At that time, the output voltage of unit 103 at terminals 82 is the output voltage of rotor winding 77, and therefore is proportional to $t_2$. Rotor winding 76 of potentiometer 74 is now connected in series with terminals 82, rotor winding 85, and control field winding 78 through switches 35, 40, 42 and 34, so that the output voltage of rotor winding 76 is matched to the algebraic sum of the voltage at terminals 82 and the output voltage of rotor winding 85 of induction potentiometer 84.

Just prior to the third observation, the voltage at terminals 10 is proportional to $t_3$, so that the excitation voltage of stator winding 83 is $t_3-t_2$ and the displacement of shaft 71 is proportional to $$\frac{t_3}{t_2+t_3}$$

so that the output voltage of rotor winding 85 is proportional to $$\frac{t_3(t_3-t_2)}{t_3+t_2}$$

The output voltage of rotor winding 76 is therefore matched to a voltage proportional to $$t_2 + \frac{t_3(t_3-t_2)}{t_2+t_3}$$

which may also be expressed as $$\frac{t_2^2+t_3^2}{t_2+t_3}$$

or $$\frac{\sum_1^{m+1} t_n^2}{\sum_1^{m+1} t_n}$$

where $m=2$. Accordingly, at the third observation, when switch 27' is closed and relay winding 27 is energized thereby, the rotor winding 76 is connected to the output terminals 82 and the output of denominator unit 103 is proportional to $$\frac{t_2^2+t_3^2}{t_2+t_3}$$

or $$\frac{\sum_1^m t_n^2}{\sum_1^m t_n}$$

where $m=3$. Similar analysis of the operation shows that for subsequent observations the amplitude of voltage at terminals 82 is proportional to $$\frac{\sum_1^m t_n^2}{\sum_1^m t_n}$$

Terminals 58 of denominator unit 104 and terminals 82 of denominator unit 103 are electrically connected in series with terminals 90, so that the voltage at terminals 90 is the difference between the voltages at terminals 82 and 58, and is proportional to $$\frac{\sum_1^m t_n^2}{\sum_1^m t_n} - \frac{\sum_1^m t_n}{m}$$

the denominator $\Delta$ of Equation 3A, and may be read on meter 90', or may be used as an input to other computing circuits.

Referring now to Figs. 3 and 4, these diagrams embody two circuits similar to the circuit of Fig. 2 in which voltages proportional to $N_n$ and $N_e$, the numerator of Equation 3A, are respectively produced. In Figs. 3 and 4, units 104' and 104" are similar to unit 104 of Fig. 2, and the corresponding switches therein are operated by relays 37 and 27, as before. However, relay winding 92 and switch 92' replace relay winding 38 and switch 38' of Fig. 2 for reasons to be explained. Transformer unit 100' and 100" are similar to transformer unit 100 of Fig. 2, and units 103' and 103" are similar to unit 103, except that relay winding 92 replaces relay winding 38. Units 101', 101" and 102', 102" are the same as units 101 and 102 of Fig. 2.

When a voltage whose amplitude is proportional to $D_n$ is applied to terminals 93 of Fig. 3 and is supplied to both transformer unit 100' and numerator unit 103', the signal $$\frac{D_n}{m}$$

at terminals 94 results and is supplied to unit 104'. Also, the voltages K and $$K\left(\frac{m-1}{m}\right)$$

are supplied to unit 104' from transformer unit 101' and the amplitude of the output voltage of unit 104' at terminals 95 is proportional $$\frac{\sum_{1}^{m} D_{nn}}{m}$$

Shaft 71 of time-ratio-multiplier unit 102' supplies a mechanical input proportional to $$\frac{t_{m+1}}{\sum_{1}^{m+1} t_n}$$

to 103', so that the amplitude of the output voltage at terminals 96 is proportional to $$\frac{\sum_{1}^{m} t_n D_{nn}}{\sum_{1}^{m} t_n}$$

The amplitude of the voltage output at terminals 97 which may be read on voltmeter 97' is therefore proportional to $$\frac{\sum_{1}^{m} t_n D_{nn}}{\sum_{1}^{m} t_n} - \frac{\sum_{1}^{m} D_{nn}}{m}$$

or is proportional to the numerator $N_n$ of Equation 3A for the north component of distance travelled by the target.

Similarly, in Fig. 4, where the input signal to terminals 99 is proportional to $D_e$, the voltage at terminals 98, which may be read on voltmeter 98', would be proportional to $$\frac{\sum_{1}^{m} t_n D_{en}}{\sum_{1}^{m} t_n} - \frac{\sum_{1}^{m} D_{en}}{m}$$

the numerator of Equation 3A for the east component of distance travelled by the target.

Switches 41 and 42 of units 104 and 103, respectively, are operated by relay winding 38, and the corresponding switches of units 104', 103' and 104" and 103", are operated by relay winding 92, in Figs. 2, 3 and 4, and are provided to allow for any delay in establishing the observed distance travelled by the target at elapsed time $t_m$. Whenever an adjustment of the range detection equipment to the observed values is necessary, or when the range and bearing of the target are determined by some apparatus utilizing the time elapsed between a transmitted and received signal as a measure of the range, the distances $D_{nm}$ and $D_{em}$ may be established a short time later than the instant of the observation, $t_m$.

Referring especially to Fig. 2, and considering the usual case, where a short time interval is present between the time mark and the establishment of the signals proportional to distance travelled by the target north and east at that particular time, relay winding 38 is energized by closing switch 38' at the time mark for each observation, thereby opening switches 41 and 42 and stopping the induction motors 53 and 79 or 51 and 87 in units 104 and 103 and preserving the output signals of induction potentiometers 47 and 74, or 44 and 75 at their matched values.

At some instant after the time mark for observation $m$, the signals proportional to $D_{em}$ and $D_{nm}$ are determined, at which instant relay winding 92 of Figs. 3 and 4 is energized by closing switch 92', thereby stopping the induction motors in units 104', 103' and 104" and 103" and thus preserving the output of the induction potentiometers at their matched values.

With the induction motors in units 104, 103 and 104', 103' and 104" and 103" stopped, relay winding 27 is allowed to actuate all of its associated switches, and relay winding 18 causes the movable contacts of switch 14 to be advanced one step so that voltages equivalent to Δ, $N_n$ and $N_e$ are available at terminals 90, 98, and 99, respectively. Relay windings 38, 92 are then de-energized to allow the instrument to build up new values necessary to compute Δ, $N_n$, $N_e$ at the next observation, whereupon the sequence of operations is repeated. In addition, by opening switches 41 and 42 before operating relay 27, the motors 51, 53, 79 and 87 will not be affected by the switching transient effects of switches 28, 29, 30, 31, 32, 33, 34 and 35.

Although a preferred embodiment of the invention has been illustrated and described herein, it is to be understood that the invention is not limited thereby, but is susceptible of changes in form and detail with the scope of the appended claims. Thus, although the description of the invention has specified the use of induction potentiometers 44, 47, 75, 74 in denominator units 104 and 103 and the corresponding induction potentiometers in numerator units 104', 103' and 104", 103", other devices whose output voltage is controlled by the angular displacement of a shaft, such as an induction resolver, for example, may be used with equal facility. However, if the induction potentiometer 65 is replaced with a resolver, for example, in which the ratio of output voltage to angular shaft displacement is non-linear it is imperative that the induction potentiometer 84 is also replaced with a similar resolver.

We claim:

1. In mathematical analyzing apparatus, the combination of an energized winding having a plurality of taps, a brush adapted to successively engage said taps, actuating means for said brush, a potentiometer having a stator winding connected to said brush and to said energized winding and having a rotor winding, motive means having a control winding connected in series with said rotor winding, operative connections between said motive means and said rotor winding, a second energized winding having taps, a brush driven by said actuating means into successive engagement with said second winding taps, terminals connected to said second energized winding and said second brush, and series connections between said rotor winding and said terminals whereby said motive means is energized to drive said rotor winding to a position where its output voltage matches the voltage at said terminals.

2. In mathematical analyzing apparatus, the combination of a source of signal voltage, a winding energized thereby and having a plurality of taps, a brush adapted to successively engage said taps, actuating means for said brush, a potentiometer having a stator winding connected to said brush and to said source and having a rotor winding, motive means having a control winding connected in series with said rotor winding, operative connections between said motive means and said rotor winding, a second source of signal voltage, a second winding energized thereby and having taps, a brush driven by said actuating means into successive engagement with said second winding taps, terminals connected to said second energized winding and said second brush, and series connections between said rotor winding and said terminals whereby said motive means is energized to drive said rotor winding to a position where its output voltage matches the voltage at said terminals.

3. In mathematical analyzing apparatus, the combination of an energized winding having a plurality of taps, a brush adapted to successively engage said taps, actuating means for said brush, a potentiometer having a stator winding connected to said brush and a rotor winding, a pair of output terminals, motive means having a control winding connected in series with said rotor winding and with said terminals, operative connections between said motive means and said rotor winding for driving the same to a position where its output voltage matches the voltage at said terminals, a second energized winding having taps, a brush driven by said actuating means into successive engagement with said second winding taps, series connections between the output of said second tapped winding and said rotor winding and with said terminals, a second potentiometer having a stator winding connected to said terminals and a rotor winding, a second motive means having a control winding connected to the output of said second tapped winding and to said last-named rotor winding, operative connections between said second motive means and the rotor winding of said second potentiometer, a third potentiometer having a rotor winding and a stator winding connected in series with the input to said second tapped winding, operative connections between said second motive means and the rotor winding of said third potentiometer, a fourth potentiometer having a rotor winding and an energized stator winding, third motive means having a control winding connected in series with the rotor winding of said fourth potentiometer and with the rotor winding of said third potentiometer, and operative connections between said third motive means and the rotor winding of said fourth potentiometer 4. In mathematical analyzing apparatus, the combination of a winding having a plurality of taps, a series of electrical contacts severally connected to certain of said taps, a brush engaging said contacts, a source of input voltage connected across said winding and said brush, a second series of electrical contacts severally connected to the other of said winding taps, a second brush engaging said second series of contacts, actuating means for driving said brushes in successive engagement with the corresponding series of contacts, an induction potentiometer having a rotor winding and a stator winding electrically connected across said brushes, motive means having a control winding, a second source of input voltage, a pair of terminals electrically connected in series with said rotor winding, said control winding and with said last-named voltage source, operative connections between said motive means and said rotor winding for driving the latter to a position where its output voltage matches the voltage at said terminals to deenergize said motive means, a second induction potentiometer having a rotor winding and a stator winding electrically connected across said brushes, a second motive means having a control winding, series connections between said terminals and said second motive means control winding and said second induction potentiometer rotor winding, operative connections between said second motive means and said second potentiometer rotor winding for driving the latter to a position where the voltage induced therein matches the voltage at said terminals to thereby deenergize said second motive means, and switching means interposed in the connections between said stator windings and said brushes for alternatively connecting one of said stator windings across said brushes and connecting the other stator winding to said first-named voltage source.

5. In mathematical analyzing apparatus, the combination of a winding having a plurality of taps, a series of electrical contacts severally connected to certain of said taps, a brush engaging said contacts, a source of input voltage connected across said winding and said brush, a second series of electrical contacts severally connected to the other of said winding taps, a second brush engaging said second series of contacts, actuating means for driving said brushes in successive engagement with the corresponding series of contacts, an induction potentiometer having a rotor winding and a stator winding electrically connected across said brushes, motive means having a control winding, a second source of input voltage, a pair of terminals electrically connected in series with said rotor winding, said control winding and with said last-named voltage source, operative connections between said motive means and said rotor winding for driving the latter to a position where its output voltage matches the voltage at said terminals to deenergize said motive means, a second induction potentiometer having a rotor winding and a stator winding electrically connected across said brushes, a second motive means having a control winding, series connections between said terminals and said second motive means control winding and said second induction potentiometer rotor winding, operative connections between said second motive means and said second potentiometer rotor winding for driving the latter to a position where the voltage induced therein matches the voltage at said terminals to thereby deenergize said second motive means, and switching means interposed in both of said series connections for respectively interchanging the said connections of said rotor windings.

6. In mathematical analyzing apparatus, the combination of a winding having a plurality of taps, a series of electrical contacts severally connected to certain of said taps, a brush engaging said contacts, a source of input voltage connected across said winding and said brush, a second series of electrical contacts severally connected to the other of said winding taps, a second brush engaging said second series of contacts, actuating means for driving said brushes in successive engagement with the corresponding series of contacts, an induction potentiometer having a rotor winding and a stator winding electrically connected across said brushes, motive means having a control winding, a second source of input voltage, a pair of terminals electrically connected in series with said rotor winding, said control winding and with said last-named voltage source, operative connections between said motive means and said rotor winding for driving the latter to a position where its output voltage matches the voltage at said terminals to deenergize said motive means, a second induction potentiometer having a rotor winding and a stator winding electrically connected across said brushes, a second motive means having a control winding, series connections between said terminals and said second motive means control winding and said second induction potentiometer rotor winding, operative connections between said second motive means and said second potentiometer rotor winding for driving the latter to a position where the voltage induced therein matches the voltage at said terminals to thereby deenergize said second motive means, and switching means interposed in the connections between said stator windings and said brushes for alternatively connecting one of said stator windings across said brushes and disconnecting the other stator winding therefrom and between said rotor windings and the corresponding series connections for changing the same.

7. In mathematical analyzing apparatus, the combination of an energized winding having a plurality of taps, a brush adapted to successively engage said taps, actuating means for said brush, a potentiometer having a stator winding connected to said brush and a rotor winding, motive means having a control winding connected in series with said rotor winding, operative connections between said motive means and said rotor winding, a second energized winding having taps, a brush driven by said actuating means into successive engagement with said second winding taps, terminals, series connections between the output of said second winding and said rotor winding and said terminals, a second potentiometer having a stator winding connected to said terminals and a rotor winding, a second motive means having a control winding connected to the output of said second winding and to said last-named rotor winding, operative connections between said second motive means and the rotor winding of said second potentiometer, a third potentiometer having a rotor winding and a stator winding connected in series with the input to said second winding, operative connections between said second motive means and the rotor winding of said third potentiometer, a fourth potentiometer having a rotor winding and an energized stator winding, third motive means having a control winding connected in series with the rotor winding of said fourth potentiometer and with the rotor winding of said third potentiometer, operative connections between said third motive means and the rotor winding of said fourth potentiometer, a fifth potentiometer having an energized stator winding with a rotor winding connected in series with said third potentiometer rotor winding, fourth motive means having a control winding connected in series with said fifth potentiometer rotor winding, and operative connections between said fourth motive means and the fifth potentiometer rotor winding.

8. In mathematical analyzing apparatus, the combination of a winding having a plurality of taps, a series of electrical contacts severally connected to certain of said taps, a brush engaging said contacts, a source of input voltage connected across said winding and said brush, a second series of electrical contacts severally connected to the other of said winding taps, a second brush engaging said second series of contacts, actuating means for driving said brushes in successive engagement with the corresponding series of contacts, a second source of input voltage, an induction potentiometer having a rotor winding and a stator winding connected to said second voltage source, motive means having a control winding, a pair of terminals electically connected in series with said rotor winding and with one of said brushes, operative connections between said motive means and said rotor winding, a second induction potentiometer having a rotor winding and a stator winding connected to said second voltage source, a second motive means having a control winding, series connections between said terminals and said second motive means control winding and said second induction potentiometer rotor winding, operative connections between said second motive means and said second potentiometer rotor winding for driving the latter to a position where the voltage induced therein matches the voltage at said terminals to thereby deenergize said second motive means, and switching means interposed in the connections between said stator windings and said second source for alternatively connecting one of said stator windings to said second source and disconnecting the other stator winding therefrom.

9. In mathematical analyzing apparatus, the combination of a winding having a plurality of taps, a series of electrical contacts severally connected to certain of said taps, a brush engaging said contacts, a source of input voltage connected across said winding and said brush, a second series of electrical contacts severally connected to the other of said winding taps, a second brush engaging said second series of contacts, actuating means for driving said brushes in successive engagement with the corresponding series of contacts, an induction potentiometer having a rotor winding and a stator winding, motive means having a control winding, a source of time-controlled voltage, a pair of terminals electrically connected in series with said rotor winding and with one of said brushes, operative connections between said motive means and said rotor winding, a second source of input voltage, a second induction potentiometer having a rotor winding and a stator winding electrically connected to said terminals, a switch between said second source and said last-named stator winding for alternatively connecting the latter to said terminals and said second source, a second motive means having a control winding connected to said time-controlled source, a switch between said last-named control winding and said second source for alternatively connecting said last-named control winding to said time-controlled source and said second source, series connections betwen said time-controlled source and said second motive means control winding and said second induction potentiometer rotor winding, and operative connections between said second motive means and said second potentiometer rotor winding for driving the latter to a position where the voltage induced therein matches the voltage at said time-controlled source to thereby deenergize said second motive means.

10. In a mathematical analyzing apparatus, the combination of a source of input voltage, a potentiometer having an energized winding and a rotor winding, motive means having a control winding, operative connections between said motive means and said rotor winding, a second potentiometer having an energized winding and a rotor winding, second motive means having a control winding, operative connections between said second motive means and said second rotor winding, a pair of output terminals, series connections between said first rotor winding and said output terminals, series connections between said input voltage source, said output terminals, said second rotor winding and said second control winding whereby said second motive means drives said second rotor winding to match the sum of the voltages at said output terminals and the input voltage source, and switching means interposed in said two series connections for interchanging the connections of said rotor windings and said control windings.

11. In a mathematical analyzing apparatus, the combination of a source of input voltage, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said input voltage source, said output terminals, said second rotor winding and said second control winding whereby said second motive means drives said second rotor winding to match the sum of the voltages at said output terminals and the input voltage source, switching means interposed in said two series connections for interchanging the connections of said rotor windings and said control windings, a second source of input voltage connected to said stator windings, and second switching means interposed in the connections between said second input voltage source and said stator windings for alternatively energizing the same.

12. In a mathematical analyzing apparatus, the combination of a source of input voltage, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said input voltage source, said output terminals, said second rotor winding and said second control winding whereby said second motive means drives said second rotor winding to match the sum of the voltages at said output terminals and the input voltage source, switching means interposed in said two series connections for interchanging the connections of said rotor windings and said control windings, a second source of input voltage connected to said stator windings, second switching means interposed in the connections between said second input voltage source and said stator windings for alternatively energizing the same, and means for simultaneously actuating both said switching means.

13. In a mathematical analyzing apparatus, the combination of a winding having a plurality of taps, a series of electrical contacts severally connected to said taps, a brush engaging said contacts, actuating means for driving said brush in successive engagement with said contacts, a source of input voltage connected across said winding, a potentiometer having an energized winding and a rotor winding, motive means having a control winding, operative connections between said motive means and said rotor winding, a second potentiometer having an energized winding and a rotor winding, second motive means having a control winding, operative connections between said second motive means and said second rotor winding, a pair of output terminals, series connections between said first rotor winding and said output terminals, series connections between said brush, said first-named winding, said output terminals, said second rotor winding and said second control winding whereby said second motive means drives said second rotor winding to match the sum of the voltages at said output terminals and the output of said winding, and switching means interposed in said two series connections for interchanging the connections of said rotor windings and said control windings.

14. In a mathematical analyzing apparatus, the combination of a winding having a plurality of taps, a series of electrical contacts severally connected to said taps, a brush engaging said contacts, actuating means for driving said brush in successive engagement with said contacts, a source of input voltage connected to one end of said winding and to said brush, a second source of input voltage, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said second input voltage source, said output terminals, said second rotor winding and said second control winding whereby said second motive means drives said second rotor winding to match the sum of the voltages at said output terminals and said second input voltage source, switching means interposed in said two series connections for interchanging the connections of said rotor windings and said control windings, connections between said brush and said stator windings, and second switching means interposed in said last-named connections for alternatively energizing said stator windings in accordance with the position of said brush.

15. In a mathematical analyzing apparatus, the combination of a winding having a plurality of taps, a series of electrical contacts severally connected to said taps, a brush engaging said contacts, actuating means for driving said brush in successive engagement with said contacts, a source of input voltage connected to one end of said winding and to said brush, a second source of input voltage, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said second input voltage source, said output terminals, said second rotor winding and said second control winding whereby said second motive means drives said second rotor winding to match the sum of the voltages at said output terminals and said input voltage source, switching means interposed in said two series connections for interchanging the connections of said rotor windings and said control windings, connections between said brush and said stator windings, second switching means interposed in said last-named connections for alternatively energizing said stator windings in accordance with the position of said brush, and means for simultaneously actuating both said switching means.

16. In a mathematical analyzing apparatus, the combination of a source of input voltage, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said input voltage source, said output terminals, said second rotor winding and said second control winding whereby said second motive means drives said second rotor winding to match the sum of the voltages at said output terminals and the input voltage source, switching means interposed in said two series connections for interchanging the connections of said rotor windings and said control windings, a winding having a plurality of taps, a brush adapted to engage said taps, a second source of input voltage connected to one end of said tapped winding and to said brush, actuating means for driving said brush in engagement with said taps, and connections between said brush, said one end of said tapped winding, and said stator windings and controlled by said switching means for alternatively energizing said stator windings in accordance with the position of said brush.

17. In a mathematical analyzing apparatus, the combination of a source of input voltage, a potentiometer having an energized winding and a rotor winding, motive means having a control winding, operative connections between said motive means and said rotor winding, a second potentiometer having an energized winding and a rotor winding, second motive means having a control winding, operative connections between said second motive means and said second rotor winding, a pair of output terminals, series connections between said first rotor winding and said output terminals, a winding connected to said input voltage source and having a plurality of taps, a brush adapted to engage said taps, actuating means for driving said brush in engagement with said taps, series connections between said tapped winding, said output terminals, said second rotor winding, said second control winding and said brush whereby said second motive means drives said second rotor winding to match the sum of the voltages at said output terminals and the output of said winding, and switching means interposed in said two series connections for interchanging the connections of said rotor windings and said control windings.

18. In a mathematical analyzing apparatus, the combination of a multiple tap winding, a brush adapted to engage said taps, actuating means for driving said brush in successive engagement with said taps, a source of input voltage connected to said winding, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said brush, said first-named winding, said output terminals, said second rotor winding and said second control winding whereby said second motive means drives said second rotor winding to match the sum of the voltages at said output terminals and the output of said winding, switching means interposed in said two series connections for interchanging the connections of said rotor windings and said control windings, a second multiple tap winding, a brush adapted to engage said last-named taps, a second source of input voltage connected to one end of said second tapped winding and to said last-named brush, actuating means for driving said second brush in engagement with said last-named taps, connections between said second brush, said one end of said second tapped winding and said stator windings, and second switching means interposed in said last-named connections for alternatively energizing said stator windings in accordance with the position of said last-named brush.

19. In a mathematical analyzing apparatus, the combination of a multiple tap winding, a brush adapted to engage said taps, actuating means for driving said brush in successive engagement with said taps, a source of input voltage connected to said winding, a potentiometer having a stator winding and a rotor winding, motive means having a control winding, operative connections between said motive means and said rotor winding, a second potentiometer having a stator winding and a rotor winding, second motive means having a control winding, operative connections between said second motive means and said second rotor winding, a pair of output terminals, series connections between said first rotor winding and said output terminals, series connections between said brush, said first-named winding, said output terminals, said second rotor winding and said second control winding whereby said second motive means drives said second rotor winding to match the sum of the voltages at said output terminals and the output of said winding, switching means interposed in said two series connections for interchanging the connections of said rotor windings and said control windings, a second multiple tap winding, a brush adapted to engage said last-named taps, a second source of input voltage connected to one end of said second tapped winding and to said last-named brush, operative connections between said actuating means and said second brush, connections between said second brush, said one end of said second tapped winding and said stator windings and controlled by said switching means for alternatively energizing said stator windings in accordance with the position of said second brush.

20. In a mathematical analyzing apparatus, the combination of a winding having a plurality of taps, a series of electrical contacts severally connected to certain of said taps, a brush engaging said contacts, a source of input voltage connected to one end of said winding and said brush, a second series of electrical contacts severally connected to the other of said winding taps, a second brush engaging said second series of contacts, actuating means for driving said brushes in successive engagement with the corresponding series of contacts, a potentiometer having a rotor winding and a stator winding, motive means having a control winding, operative connections between said motive means and said rotor winding, a second potentiometer having a rotor winding and a stator winding, second motive means having a control winding, operative connections between said second motive means and said second rotor winding, a second source of input voltage, a pair of output terminals, series connections between said first stator winding and said brushes, and between said second stator winding and said first input voltage source, second series connections between said terminals and said first rotor winding, third series connections between said terminals, said second voltage source, said second rotor winding and said second control winding whereby the second motive means is energized to drive the second rotor winding to the position where its output matches the sum of the voltage at the output terminals and said second voltage source, switching means interposed in the connections between the stator windings and the brushes and said first input voltage source to simultaneously interchange the connections to the stator windings, and second switching means interposed in the connections between the rotor windings and the output terminals and the control windings to simultaneously interchange the connections therebetween.

21. In a mathematical analyzing apparatus, the combination of a winding having a plurality of taps, a series of electrical contacts severally connected to certain of said taps, a brush engaging said contacts, a source of input voltage connected to one end of said winding and said brush, a second series of electrical contacts severally connected to the other of said winding taps, a second brush engaging said second series of contacts, actuating means for driving said brushes in successive engagement with the corresponding series of contacts, a potentiometer having a rotor winding and a stator winding, motive means having a control winding, operative connections between said motive means and said rotor winding, a second potentiometer having a rotor winding and a stator winding, second motive means having a control winding, operative connections between said second motive means and said second rotor winding, a second source of input voltage; a pair of output terminals, series connections between said first stator winding and said brushes, and between said second stator winding and said first input voltage source, second series connections between said terminals and said first rotor winding, third series connections between said terminals, said second voltage source, said second rotor winding and said second control winding whereby the second motive means is energized to drive the second rotor winding to the position where its output matches the sum of the voltage at the output terminals and said second voltage source, switching means interposed in the connections between the stator windings and the brushes and said first input voltage source to simultaneously interchange the connections to the stator windings, second switching means interposed in the connections between the rotor windings and the output terminals and the control windings to simultaneously interchange the connections therebetween, and means for simultaneously actuating both said switching means.

22. In a mathematical analyzing apparatus, the combination of a multiple-tapped winding, a series of electrical contacts severally connected to the taps of said winding, a brush engaging said contacts, a source of input voltage connected to one end of said winding and to said brush, actuating means for driving said brush in successive engagement with the corresponding series of contacts, a potentiometer having a rotor winding and a stator winding, motive means having a control winding, operative connections between said motive means and said rotor winding, a second potentiometer having a rotor winding and a stator winding, second motive means having a control winding, operative connections between said second motive means and said second rotor winding, a second multiple-tapped winding, a second series of electrical contacts connected to said winding taps, a second brush engaging said second contacts and actuated by said actuating means, a second voltage source connected to one end of said second tapped winding and to said second brush, a pair of output terminals, series connections between said first stator winding and said first brush, and between said second stator winding and said first input voltage source, second series connections between said terminals and said first rotor winding, a source of time-controlled voltage, third series connections between said terminals, said second brush, said second tapped winding, said second rotor winding and said second control winding whereby the second motive means is energized to drive the second rotor winding to the position where its output matches the sum of the voltage at the output terminals and the time controlled voltage, switching means interposed in the connections between the stator windings and the first brush and the input source to simultaneously interchange the connections to the stator windings, and second switching means interposed in the connections between the rotor windings and the output terminals and the control windings to simultaneously interchange the connections therebetween.

23. In a mathematical analyzing apparatus, the combination of a multiple-tapped winding, a series of electrical contacts severally connected to the taps of said winding, a brush engaging said contacts, a source of input voltage connected to one end of said winding and to said brush, actuating means for driving said brush in successive engagement with the corresponding series of contacts, a potentiometer having a rotor winding and a stator winding, motive means having a control winding, operative connections between said motive means and said rotor winding, a second potentiometer having a rotor winding and a stator winding, second motive means having a control winding, operative connections between said second motive means and said second rotor winding, a second multiple-tapped winding, a second series of electrical contacts connected to said winding taps, a second brush engaging said second contacts and actuated by said actuating means, a second voltage source connected to one end of said second tapped winding and to said second brush, a pair of output terminals, series connections between said first stator winding and said first brush, and between said second stator winding and said first input voltage source, second series connections between said terminals and said first rotor winding, a source of time-controlled voltage, third series connections between said terminals, said second brush, said second tapped winding, said second rotor winding and said second control winding whereby the second motive means is energized to drive the second rotor winding to the position where its output matches the sum of the voltage at the output terminals and the time controlled voltage, switching means interposed in the connections between the stator windings and the first brush and the input source to simultaneously interchange the connections to the stator windings, second switching means interposed in the connections between the rotor windings and the output terminals and the control windings to simultaneously interchange the connections therebetween, and means for simultaneously actuating both said switching means.

24. In a mathematical analyzing apparatus, the combination of a winding having a plurality of taps, a series of electrical contacts severally connected to certain of said taps, a brush engaging said contacts, a source of input voltage connected to one end of said winding and said brush, a second series of electrical contacts severally connected to the other of said winding taps, a second brush engaging said second series of contacts, actuating means for driving said brushes in successive engagement with the corresponding series of contacts, a potentiometer having a rotor winding and a stator winding, motive means having a control winding, operative connections between said motive means and said rotor winding, a second potentiometer having a rotor winding and a stator winding, second motive means having a control winding, operative connections between said second motive means and said second rotor winding, a second source of input voltage, a pair of output terminals, series connections between said first stator winding and said brushes, and between said second stator winding and said first input voltage source, second series connections between said terminals and said first rotor winding, and third series connections between said terminals, said second input voltage source, said second rotor winding and said second control winding whereby the second motive means is energized to drive the second rotor winding to the position where its output matches the sum of the voltage at the output terminals and the second input voltage source.

25. In a mathematical analyzing apparatus, the combination of a potentiometer having an energized stator winding and a rotor winding, motive means having a control winding, operative connections between said motive means and said potentiometer rotor winding, a second potentiometer having an energized stator winding and a rotor winding, second motive means having a control winding, operative connections between said second motive means and said second potentiometer rotor winding, a third potentiometer having a stator winding and a rotor winding, a source of input voltage, a pair of output terminals, series connections between said terminals and said input voltage source and said third stator winding, series connections between said terminals and one of said two first-named rotor windings, series connections between the output terminals, said third potentiometer rotor winding, the other of said first-named rotor windings and the corresponding control winding, whereby the corresponding motive means is energized to drive said other rotor winding to a position where the output voltage of said other rotor winding matches the sum of the voltages at the output terminals and the third rotor winding, and switching means interposed in the connections to the first and second rotor windings and the control windings to interchange the connections thereof.

26. In a mathematical analyzing apparatus, the combination of a potentiometer having an energized stator winding and a rotor winding, motive means having a control winding, operative connections between said motive means and said potentiometer rotor winding, a second induction potentiometer having an energized stator winding and a rotor winding, second motive means having a control winding, operative connections between said second motive means and said second potentiometer rotor winding, a third potentiometer having a stator winding and a rotor winding, a source of input voltage, a pair of output terminals, series connections between said terminals and said input voltage source and said third stator winding, series connections between said terminals and one of said two first-named rotor windings, series connections between the output terminals, said third potentiometer rotor winding, the other of said first-named rotor windings and the corresponding control winding, whereby the corresponding motive means is energized to drive said other rotor winding to a position where the output voltage of said other rotor winding matches the sum of the voltages at the output terminals and the third rotor winding, switching means interposed in the connections to the first and second rotor windings and the control windings to interchange the connections thereof, a fourth potentiometer having an energized stator winding and a rotor winding, third motive means having a control winding connected in series with said fourth potentiometer rotor winding, and operative connections between said third motive means and the rotor windings of said third and fourth potentiometers.

References Cited in the file of this patent

UNITED STATES PATENTS

| | | |
|---|---|---|
| 1,973,279 | Bernarde | Sept. 11, 1934 |
| 2,464,544 | Agins | Mar. 15, 1949 |
| 2,465,624 | Agins | Mar. 29, 1949 |
| 2,483,594 | Oliver | Oct. 4, 1949 |
| 2,511,614 | Agins | June 13, 1950 |